(12) United States Patent
Spindler et al.

(10) Patent No.: US 8,700,330 B2
(45) Date of Patent: Apr. 15, 2014

(54) VEHICLE NAVIGATION DEVICE AND METHOD

(75) Inventors: Carsten-Christian Spindler, Karlsruhe (DE); Simon Schütz, Stuttgart (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 25 days.

(21) Appl. No.: 13/369,966

(22) Filed: Feb. 9, 2012

(65) Prior Publication Data

US 2012/0203459 A1      Aug. 9, 2012

(30) Foreign Application Priority Data

Feb. 9, 2011   (EP) .................................... 11153921

(51) Int. Cl.
*G01C 21/34* (2006.01)
(52) U.S. Cl.
USPC .................................. 701/533; 707/E17.014

(58) Field of Classification Search
USPC ......... 701/533, 408, 410, 423, 425, 538, 455; 340/995.27, 995.19, 995.11; 707/769, 707/E17.014, E17.044
See application file for complete search history.

(56) References Cited

U.S. PATENT DOCUMENTS

| | | | | |
|---|---|---|---|---|
| 7,818,116 | B1 * | 10/2010 | Nesbitt | .......................... 701/412 |
| 8,190,358 | B2 * | 5/2012 | Machino | ....................... 701/408 |
| 2001/0021895 | A1 | 9/2001 | Yamazaki | |
| 2010/0194606 | A1 | 8/2010 | Otte | |
| 2011/0022302 | A1 | 1/2011 | Machino | |

FOREIGN PATENT DOCUMENTS

EP   1837628   9/2007

* cited by examiner

*Primary Examiner* — Marthe Marc-Coleman
(74) *Attorney, Agent, or Firm* — O'Shea Getz P.C.

(57) ABSTRACT

A vehicle navigation device comprises a map data base storing map data and a processing unit. The map data base includes first attributes indicative of the presence of express lanes and second attributes assigned to lanes to indicate which lanes of a road segment are express lanes. The processing unit is coupled to the map data base and is configured to perform a route search based at least on the first attribute and to control outputting of route guidance information via a user interface based at least on the second attribute.

20 Claims, 7 Drawing Sheets

VEHICLE NAVIGATION DEVICE AND METHOD

CLAIM OF PRIORITY

This patent application claims priority from EP Application No. 11 153 921.9 filed Feb. 9, 2011, which is hereby incorporated by reference.

1. Field of Technology

The invention relates to a vehicle navigation device comprising a map data base storing map data, to a method of generating a map data base and to a method of processing data stored in a map data base. The invention relates in particular to such devices and methods in which a map data base may include attributes.

2. Related Art

Navigation devices are known that determine a route from a starting point to a destination using map data. Generally, these navigation devices may perform a search for a route which minimizes a cost function. The cost function may represent travel time, distance or fuel costs associated with the route, or any other suitable quantity to be minimized. The route which is optimum may depend on the activation of prefer or avoid options. Prefer and avoid options for highways, ferries or tunnels may be provided.

In addition to route determination, navigation devices may also provide route guidance functions via a user interface. The provision of guidance information may involve generating an optical or audio output which provides information on a portion of a road network surrounding the vehicle, possibly combined with optical or audio directions to a driver.

The provision and use of a map data base which allow data to be used efficiently for route search and route guidance may represent a considerable challenge. For illustration, for route search, information on the fine scale structure of the road network is usually not required for locations remote from both the starting point and destination. However, information on at least certain types of roads, such as highways, at locations remote from both the starting point and destination will be required for a route search. By contrast, guidance functions may require information only in an area surrounding the vehicle, but to a greater level of detail.

Many road networks include so-called express lanes. Such express lanes can frequently be found in urban areas. Generally, an express lane is herein understood to be a lane with the access to the lane being managed by limiting the number of entrance and exit points to the facility. That is, not every access or exit point of a normal lane will also be an access or exit point of the express lane. An express lane may be physically separated or barriered from the general-purpose capacity provided within major roadway corridors or may be separated therefrom by road markings. Express lanes may be operated as reversible flow facilities or bi-directional facilities.

Accordingly, there is a need to provide vehicle navigation devices and methods which allow express lanes to be taken into account in route search and route guidance

SUMMARY OF THE INVENTION

According to an aspect, a vehicle navigation device is provided which comprises a map data base and a processing unit. The map data base stores map data comprising links and attributes. The links may represent road segments. A first attribute is respectively assigned to a subset of the links to indicate that the links included in the subset have at least one express lane. A second attribute is respectively assigned to lanes of at least a fraction of the links included in the subset to indicate which lanes of the respective road segment are express lanes. The processing unit is coupled to the map data base and configured to perform a route search based at least on the first attribute, and to control outputting of route guidance information via a user interface based at least on the second attribute.

In the navigation device, first and second attributes are used which are indicative of express lanes. This allows express lanes to be taken into account both in route search and in route guidance. The first and second attributes may be stored in separate portions of the map data base. This allows the processing unit to perform a route search taking into account express lanes by accessing the portion in which the first attributes are stored, and to perform route guidance taking into account express lanes by accessing the portion in which the second attributes are stored.

The map data base may include a data structure for each link, the data structure having for example a fixed number of data fields with a value being respectively set for each one of the data fields. The first attribute and the second attribute may be stored separately from the data structures for the links. The map data base is then required to include the first and second attributes only for links which include at least one express lane. Thereby, storage space requirements may be reduced.

The first attribute may have a Boolean parameter. The processing unit may be configured to perform a route search for links based on both the first attribute and the Boolean parameter. The Boolean parameter allows avoid and prefer options to be implemented for express lanes.

In the map data base, the first attribute with the Boolean parameter set to a first value may respectively be assigned to links which include entirely of express lanes. The first attribute with the Boolean parameter set to a second value different from the first value may respectively be assigned to links which include at least one non-express lane. This allows avoid and prefer options to be implemented for express lanes.

The first attribute may have a parameter, in particular a parameter of integer parameter type. The parameter may be indicative of a number of lanes. The processing unit may be configured to perform a route search for links based on both the first attribute and the parameter.

The map data base may include a first portion and a second portion, the first attribute being stored for example in the first portion and the second attribute being stored in the second portion. The processing unit may be configured to control the outputting of route guidance information based on data retrieved from the second portion and independently of data stored in the first portion. Alternatively or additionally, the processing unit may be configured to perform a route search based on data retrieved from the first portion and independently of data stored in the second portion. With such a map data base, information may be retrieved efficiently from the map data base for route search or route guidance. When performing route search, the processing unit may be configured to adjust costs of links in a cost model based on the first attribute if an avoid or prefer option is selected for express lanes.

The first portion and the second portion may be separate tables. The first portion may represent for example a routing layer of a map data base, and the second portion may represent a guidance layer of a map data base. The first portion and the second portion do not need to be stored in separate tables, but may be stored in logically distinct portions of a file.

The vehicle navigation device may use a tiling for organizing or processing data in the map data base. The definition of such a tiling and corresponding organization of data in the map data base facilitates local updates. Changes in map data resulting from local changes in a road network can be accommodated without requiring the complete map data base to be exchanged. The map data base may include the first attribute for links located in a tile of the tiling only if at least one of the links has at least one express lane. By omitting the first attribute for tiles in which none of the links has at least one express lane, storage space requirements may be reduced.

The vehicle navigation device may use a further tiling for guidance functions. The further tiling may be identical to or different from the tiling used for routing functions. The map data base may include the second attribute for lanes of road segments located in a tile of the further tiling only if at least one of the road segments located in the tile has at least one express lane. By omitting the second attribute for tiles in which none of the links has at least one express lane, storage space requirements may be reduced.

The map data base may be a map data base in accordance with the Navigation Data Standard (NDS).

According to another aspect, a method of generating a map data base is provided. Data including information on road segments and on lanes of each road segment are retrieved. For plural road segments, it is determined whether the road segment has at least one express lane; a first attribute is selectively assigned to a link representing the road segment if at least one lane of the road segment is an express lane; and a second attribute is selectively assigned to lanes of the link representing the road segment, the second attribute being selectively assigned based on which lanes of the road segment are express lanes. The first attributes and second attributes are stored the map data base.

Such a method allows a map data base to be generated for use in a vehicle navigation device. The map data base includes first and second attributes respectively indicative of express lanes. The first and second attributes may be used for route search and route guidance, respectively, when the map data base is deployed to vehicle navigation devices.

The selectively assigning of the first attribute may comprise setting a parameter of the first attribute based on whether all lanes of the road segment are express lanes. The parameter may be stored in the map data base. The parameter allows avoid and prefer options to be implemented for express lanes.

The first attributes may be stored in a first portion of the map data base and the second attributes may be stored in a second portion of the map data base. The first portion may represent data for route search and the second portion may represent data for outputting route guidance information. With such a map data base, information may be retrieved efficiently from the map data base for route search or route guidance.

The first portion may be a first table and the second portion may be formed as a second table separate from the first table. The first and second tables may, for example, be tables of a SQL data base.

A tiling comprising a plurality of tiles and covering the road segments may be defined. The map data base may be generated by storing data in the map data base such that data associated with road segments located in any given tile of the tiling may be identified in the map data base.

For each tile of the tiling, a first attribute may be stored in the map data base only if at least one road segment contained in the respective tile of the tiling includes at least one express lane. By omitting the first attribute for tiles in which none of the links has at least one express lane, storage space requirements may be reduced.

Similarly, a further tiling may be defined for organizing data associated with route guidance. The further tiling may be identical to the tiling. For each tile of the further tiling, a second attribute may be stored in the map data base for example only if at least one road segment contained in the respective tile of the further tiling includes at least one express lane. By omitting the second attribute for tiles in which none of the links has at least one express lane, storage space requirements may be reduced.

According to another aspect, a method of processing data stored in a map data base is provided. The map data base includes links representing road segments and first and second attributes. The first attributes are assigned to a subset of links and the second attributed are assigned to lanes of at least a fraction of the subset of links In the method, a route search is performed. Activation of a prefer or avoid option for express lanes is monitored. Costs of routes are selectively adjusted based on the first attributes assigned to links if the prefer or avoid option is activated. In the method, route guidance information is output. The route guidance information is output based on the second attributes.

Performing the route search may include identifying links to which the first attribute is assigned and selectively increasing or decreasing costs in a cost model for the links if the prefer or avoid option is activated.

Outputting the route guidance information may include identifying lanes in an environment of the vehicle which are express lanes based on the second attributes and modifying an audio or optical output based on the identified lanes.

The route search may be performed independently of the second attributes. Alternatively or additionally, the outputting of the route guidance information may be performed independently of the first attributes.

The map data base may be a map data base generated with a method of generating a map data base according to any one aspect or embodiment.

According to another aspect, a data carrier is provided which stores a map data base comprising links and attributes, the links representing road segments, wherein a first attribute is respectively assigned to a subset of the links to indicate that the links included in the subset have at least one express lane, and wherein a second attribute is respectively assigned to lanes of at least a fraction of the links included in the subset to indicate which lanes of the respective road segment are express lanes, the second attribute being different from the first attribute.

According to yet another aspect, a data carrier is provided which stores a map data base configured in accordance with the Navigation Data Standard (NDS) and which includes at least one attribute indicative of express lanes.

It is to be understood that the features mentioned above and those to be explained below can be used not only in the respective combinations indicated, but also in other combinations or in isolation.

These and other objects, features and advantages of the present invention will become apparent in light of the detailed description of the best mode embodiment thereof, as illustrated in the accompanying drawings. In the figures, like reference numerals designate corresponding parts.

DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Figure 1:
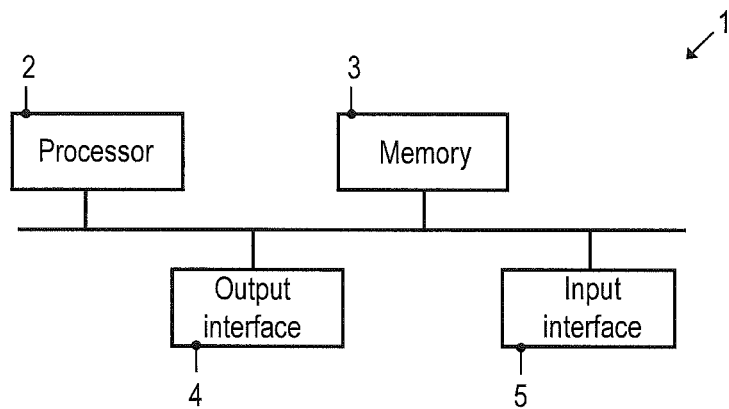
FIG. 1 is a schematic block diagram illustration of a navigation device;.

FIG. 1 schematically illustrates a vehicle navigation device 1 according to an embodiment. The navigation device 1 comprises a processing unit 2 controlling the operation of the navigation device 1, for example, according to control instructions stored in a memory. The processing unit 2 may comprise a central processing unit, for example in form of one or more microprocessors, digital signal processors or application-specific integrated circuits. The navigation device 1 further includes a map data base stored in a memory 3. The memory 3 may comprise any one, or any combination, of various types of memory, such as random access memory, flash memory or a hard drive, but also removable memories such as a compact disk (CD), a DVD, a memory card or the like. The navigation device 1 also includes an output interface 4 for outputting guidance information to a user. The output interface 4 may include an optical output device, an audio output device, or a combination thereof. The navigation device 1 also includes an input interface 5 which allows a user to set options. In particular, the input interface 5 may allow a user to set prefer or avoid options for route search.

The navigation device may include additional components, such as a position sensor and/or a wireless receiver and/or a vehicle interface. The position sensor may be adapted to determine the current position of the vehicle in which the navigation device 1 is installed. The position sensor may comprise a Global Positioning System sensor (GPS), a Galileo sensor, a position sensor based on mobile telecommunication networks and the like. The wireless receiver may be configured to receive information for updating the map data base stored in the memory 3. The vehicle interface may allow the processing unit 2 to obtain information from other vehicle systems or vehicle status information via the vehicle interface. The vehicle interface may for example comprise Controller Area Network (CAN) or Media Oriented devices Transport (MOST) interfaces.

The memory 3 stores a map data base comprising map data. The map data base includes information on links representing road segments and attributes. The map data base in particular includes attributes indicative of whether road segments represented by links include express lanes. Different first and second attributes may be provided to signal to the processor that a link includes at least one express lane and/or to provide information on which lanes of a road segment are express lanes.

The processor 2 may use the first attributes for performing a route search when a user sets, via the input interface 5, a prefer or avoid option for express lanes. The processor 2 may perform. the route search independently of the second attributes assigned to lanes. The processor 2 may use the second attributes for controlling the outputting of route guidance information via the output interface 5. The processor 2 may control the outputting of route guidance information independently of the first attributes. The map data base may therefore include different first and second attributes which are respectively associated with express lanes, with the first attribute being used for route search and the second attribute being used for route guidance.

Generally, various attributes may be assigned to links and stored in the map data base. The attributes may include information on starting and end points of links or other information related to map topology. Such attributes may be stored in a data structure having a pre-defined number of data fields which is respectively provided for each link or other map feature stored in the map data base. In addition, attributes may be selectively assigned to links, or other features, only when present on the respective link. The map data base stored in the memory 3 includes the attributes indicative of express lanes as flexible attributes which are selectively stored only for links which include at least one express lane. The attributes indicative of express lanes may be stored separately from the fixed-format data structures stored in the map data base for each link.

The map data base stored in the memory 3 may include different logical layers. Additionally, the map data base may be split into different blocks which are associated with different update regions or tiles of a tiling. Such a structure facilitates performing updates. This is particularly desirable for performing updates of the map data base to adjust the map data base to local changes in a road network. Such updates may then be performed by updating only the update regions or tiles affected by changes in the road network. This allows the updates to be more readily performed in a more time-efficient manner or as over-the-air updates.

Figure 2:
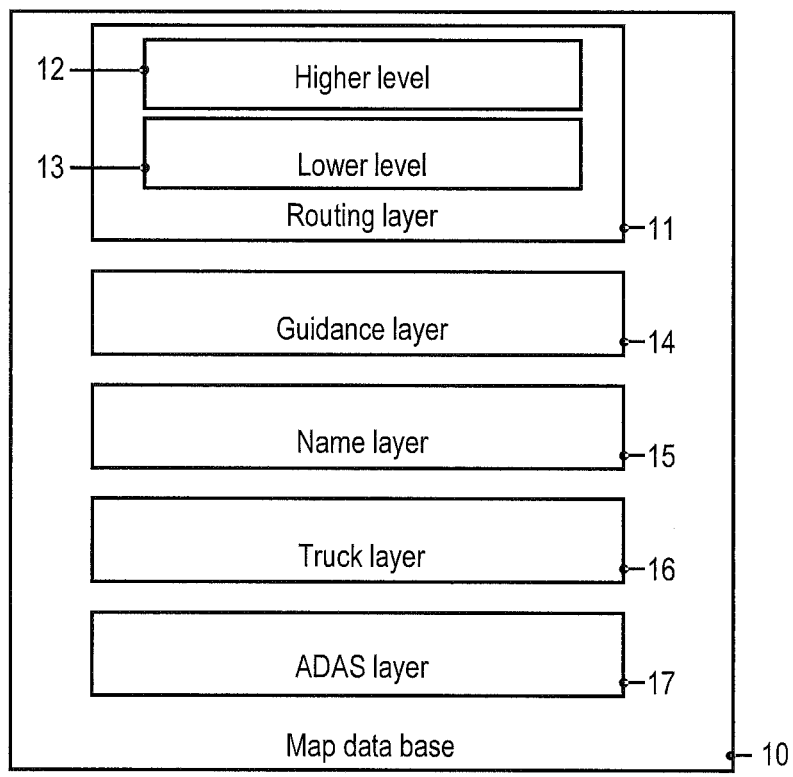
FIG. 2 is a schematic representation of a map data base.

FIG. 2 is a schematic representation of a map data base 10. A map data base 10 having the structure explained in the following may be stored in the memory 3 of the vehicle navigation device 1 (FIG. 1).

The map data base 10 includes a plurality of layers 11 and 14 which include a routing layer 11 and a guidance layer 14. The routing layer 11 includes the information required for performing route searches. This information may include information on the topology of the road network, such as starting points and end points of links The information in the routing layer 11 may further include costs associated with links for various cost models. The information in the routing layer 11 may further include attributes which allow the costs of links to be adjusted in a route search based on prefer or avoid options.

In the routing layer 11, there may be different levels 12, 13 which include data representing the road network to different levels of details. For illustration, while all road segments of the road network may be present at the level 13, some of the road segments may be omitted at a higher level 12.

The guidance layer 14 includes data required for route guidance. The guidance layer 14 may in particular include data required for optical and/or audio output of guidance information. The guidance layer may also include a level structure, with the data in the different levels representing the road network to different levels of details.

The routing layer 11 and the guidance layer 14 may be configured as separate tables stored in a memory. For illustration rather than limitation, the routing layer 11 may be a table in a SQL data base, and the guidance layer 14 may be another table in the SQL data base. The routing layer 11 and the guidance layer 14 may be stored in separate files. The routing layer 11 and the guidance layer 14 may be logically distinct portions of one file.

The map data base 10 may include additional layers 15-17. A name layer 15 includes references to road names, house numbers or similar. A truck layer 16 may include specific attributes for trucks or lorries. An Advanced Driver Assistance System (ADAS) layer 17 may include data for Advanced Driver Assistance. Additional or alternative layers may be provided, such as for example a layer for points of interest, a layer for phonetic representations, or a layer for basic map display.

The map data base 10 may have a structure as defined by the Navigation Data Standard (NDS). The NDS allows flexible attributes to be used. This allows attributes indicative of express lanes to be defined and stored when the map data base 10 is set up in accordance with the NDS.

Attributes indicative of express lanes are stored in the map data base. A first attribute may respectively be used for data stored in the routing layer 11. The first attribute may be assigned to each link which includes at least one express lane. This allows a prefer option to be implemented for road segments which include at least one express lane. The map data base 10 may store the first attribute both for directed and for undirected links. If the map data base 10 is structured such that different types of links are distinguished, the map data base 10 may store the first attribute for all types of links. For illustration, if the map data base 10 includes base links located entirely in a tile of a tiling and route links extending across tile boundaries, the map data base 10 may store the first attribute assigned to both base links and route links.

The first attribute may have a parameter, which may be a Boolean parameter. For any link for which the first attribute is stored in the map data base 10, the parameter may have one value (e.g., TRUE), if all lanes of the road segment are express lanes. The parameter may have another value (e.g., FALSE), if there is at least one lane which is not an express lane. Based on the first attribute and its parameter, the processor 2 can determine whether any road segment consists entirely of express lanes, in which case its costs are increased in route search if an avoid option for express lanes is selected. The processor 2 can also determine whether any road segment has at least one express lane, in which case its costs are decreased in route search if a prefer option for express lanes is selected.

The first attribute may be stored separately from the fixed-format data structure which is stored in the map data base 10 for every link or other map feature. Therefore, it is not required to reserve storage space for a flag which must be set for each road segment to indicate whether or not the road segment includes an express lane. It is also not required to reserve storage space for a flag which must be set for each road segment to indicate whether or not the road segment consists entirely of express lanes. Rather, such information is included as a flexible attribute. The first attribute may be omitted for update regions or tiles in which there is no link that includes at least one express lane. Storage space requirements for storing information on express lanes can thereby be reduced.

When performing a route search, the processor 2 may take into account an avoid option or a prefer option for express lanes based on the first attribute and its parameter stored in the routing layer 11. Such a procedure is described in more detail with reference to FIGS. 3 and 4 below.

A second attribute indicative of express lanes may be stored in the guidance layer 14. The second attribute may be selectively stored for only those road segments which include at least one express lane. In some implementations, the second attribute may be selectively assigned to lanes of a road segment only if the road segment has at least one lane which is an express lane and another lane which is not an express lane. The second attribute may be stored in the guidance layer 14 to indicate to the processor 2 that the respective road segment includes at least one express lane, and may additionally provide information on which lanes of the road segment are express lanes. For assigning the second attribute to lanes, additional information may be selectively stored in the map data base 10 for links which include at least one express lane to indicate which lanes of the respective road segment are express lanes. This additional information may be stored in the form of a lane mask which has one value (e.g., "1") for a lane which is an express lane and another value (e.g., "0") for a lane which is not an express lane. Such additional information may be used to assign the second attribute to individual lanes.

Referring to FIGS. 1 and 2, when the navigation device 1 performs route guidance, the processor 2 accesses the guidance layer 14 to retrieve data for route guidance. Typically, only data relating to an area surrounding the vehicle must be retrieved for route guidance. When retrieving data for a road segment from the guidance layer 14, the processor 2 determines whether the second attribute is assigned to one lane or several lanes of the respective road segment. The processor 2 may group the second attribute with additional information indicating which lanes are express lanes, e.g., in the form of a lane mask, to determine which lanes of the road segment are express lanes. Alternatively, the second attribute may be separately stored for individual lanes.

The processor 2 may control the route guidance based on which lanes of the road segment are express lanes. For example, an audio output with driving directions may be controlled based on which lanes of the road segment are express lanes. Additionally or alternatively, an optical output with driving directions may be controlled based on which lanes of the road segment are express lanes.

The second attribute may be stored separately from the fixed-format data structure which is stored in the map data base 10 for every link or other map feature. Therefore, it is not required to reserve storage space for a flag which must be set for each road segment to indicate which lanes of the road segment are express lanes. The second attribute may be omitted for update regions or tiles in which there is no road segment that includes at least one express lane. Storage space requirements for storing information on express lanes can thereby be reduced.

When performing route guidance, the processor 2 may take into account which lanes of a road segment are express lanes based on the second attribute stored in the guidance layer 14. Such a procedure is described in more detail with reference to FIG. 5.

While the first and second attributes are stored separately in different layers of the map data base 10, the overhead storage space required for storing this information associated with express lane information may be kept moderate. The map data base 10 includes the first and second attribute selectively only for those road segments which include at least one express lane. Additionally, by using separate first and second attributes in the different layers 11 and 14, access to the map data base 10 may be performed efficiently both in route search and in route guidance.

Figure 3:
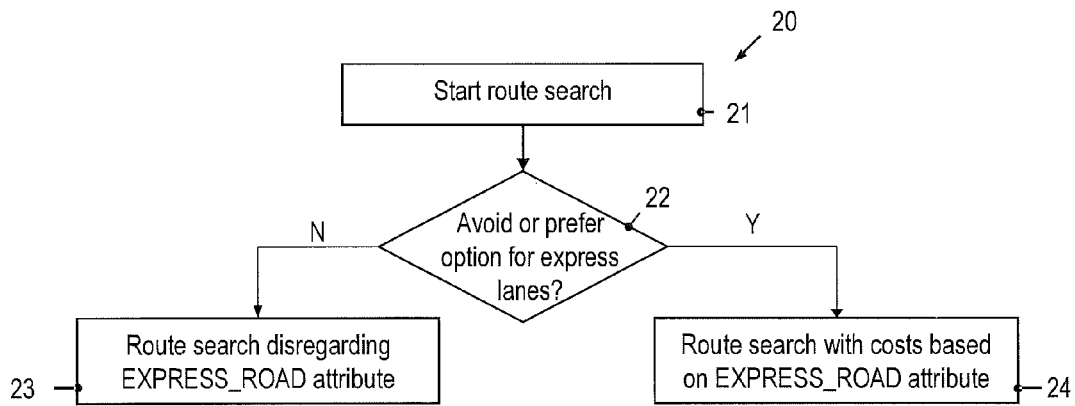
FIG. 3 is a flow chart illustration of a procedure for performing a route search.
Figure 4:
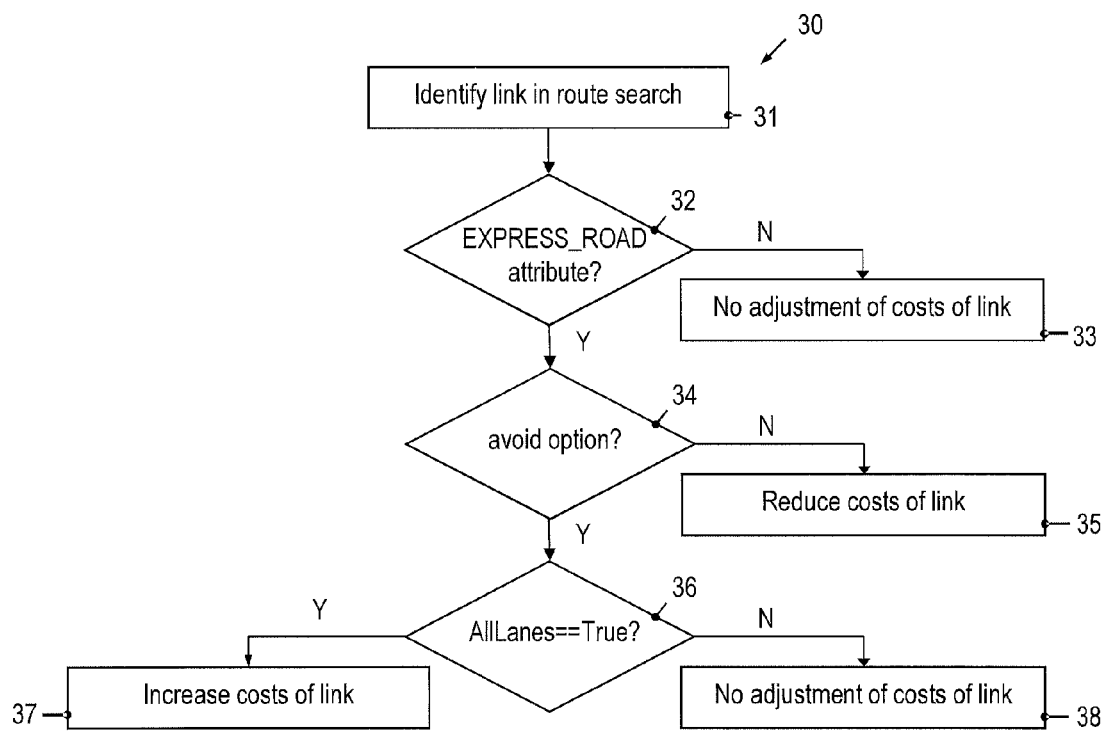
FIG. 4 is a flow chart illustrating the use of express lanes attributes in a route search.
Figure 5:
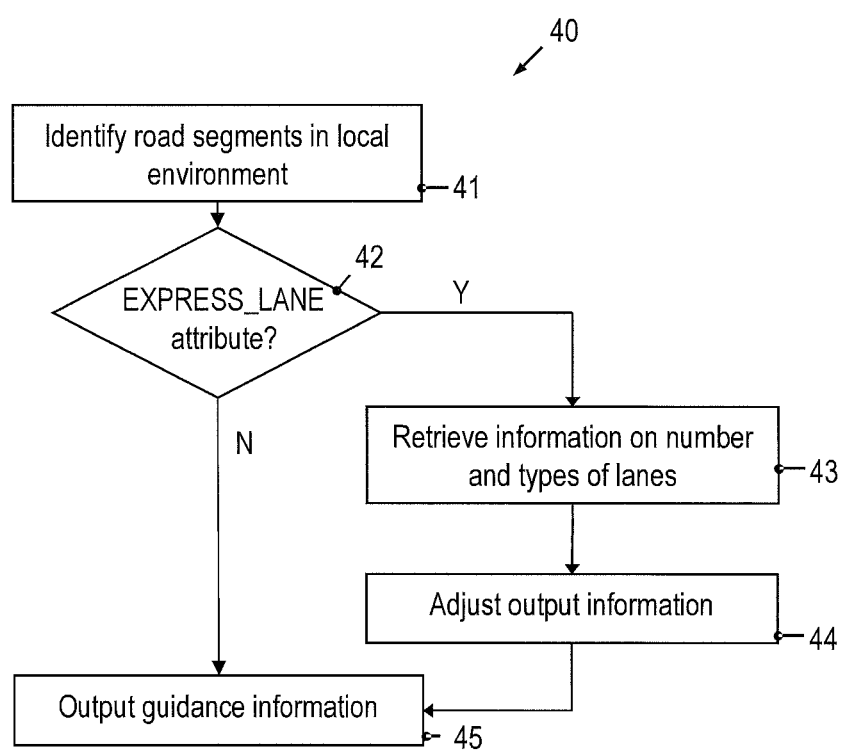
FIG. 5 is a flow chart illustration of a procedure for outputting route guidance information.

With reference to FIGS. 3-5, methods which may be performed by the processor 2 of the vehicle navigation device 1 will be explained in more detail. The processor 2 may perform both route search, as illustrated in FIGS. 3 and 4, and route guidance, as illustrated in FIG. 5.

The methods may be performed using a map data base which stores information on links representing road segments and attributes indicative of express lanes. The map data base may have a configuration as explained with reference to FIG. 2 or FIGS. 6-10. For illustration, the first attribute will be referred to as "EXPRESS_ROAD" in FIGS. 3-5, the parameter of the first attribute will be referred to as "AllLanes", and the second attribute will be referred to as "EXPRESS_LANE".

FIG. 3 is a flow chart of a procedure 20 for performing a route search.

At step 21, a route search is started. The route search may be started based on a user input. Alternatively or additionally, the route search may also be started automatically when a pre-determined event is detected, e.g., when a user leaves a route which has previously been found in a route search.

At step 22, it is determined whether an avoid option or prefer option for roads having express lanes has been selected. A selection of such an avoid option or prefer option for roads may be made via an input interface and may be stored in the vehicle navigation device.

If it is determined that no avoid option or prefer option for roads having express lanes has been selected, at step 23, the route search is performed in a conventional way based on data in the map data base. The first attribute EXPRESS_ROAD is disregarded in this route search.

If it is determined that an avoid option or prefer option for roads having express lanes has been selected, then at step 24, the route search is performed taking into account the first attribute EXPRESS_ROAD assigned to some of the links. The first attribute EXPRESS_ROAD may be taken into account in various ways. For illustration, if a total avoidance option for roads with express lanes is set, all links representing roads that consist entirely of express lanes may be disregarded. Alternatively or additionally, costs of links may be adjusted for links to which a first attribute EXPRESS_ROAD is assigned, based on the avoid or prefer option. Such an adjustment of costs may be made for any one of various cost models, such as fastest route (minimizing travel time), shortest route (minimizing travel distance) or least fuel consumption route (minimizing fuel consumption).

FIG. 4 is a flow chart of a procedure 30 for adjusting link costs in a route search based on the first attribute. The procedure 30 may be used to implement a cost adjustment in the route search performed at step 24 in the procedure 20 of FIG. 3.

At step 31, a link is identified in the route search. The link may be identified, for example, in an expansion step of a search algorithm. The link may be identified, for example, in an expansion step of a Dijkstra's algorithm or an A*-algorithm. Alternatively, the adjustment of costs may be performed prior to performing, for example, Dijkstra's algorithm or an A*-algorithm. In the latter case, all links having an EXPRESS_ROAD attribute may first be identified in order to adjust the costs of these links.

At step 32, it is determined whether the identified link has the first attribute EXPRESS_ROAD assigned to it. This determination is made based on data retrieved from the map data base. For a map data base having a layered structure, the determination may be made based on first attributes stored in the routing layer 11 (FIG. 2).

If it is determined that the identified link has no first attribute EXPRESS_ROAD assigned to it, then at step 33, the costs of the link remain unadjusted. The route search may continue with the costs which represent the costs of the respective cost model.

If it is determined that the identified link has a first attribute EXPRESS_ROAD assigned to it, then at step 34, it is determined whether an avoid option for express lanes has been set.

If it is determined that no avoid option has been set, then at step 35, the costs of the link are reduced. Thereby, a prefer option for roads having express lanes is taken into account by reducing costs for links to which the first attribute EXPRESS_ROAD is assigned. Reducing the costs of the link at step 35 may be performed in various ways. For illustration, the costs of the respective cost model may be multiplied by a factor less than 1. Alternatively, a value may be subtracted from the costs of the respective cost model. Reducing the costs of the link at step 35 may be performed using mathematical operations or a table look-up. The route search may continue with the reduced costs for the link.

If it is determined that an avoid option has been set, then at step 36, it is determined whether the parameter AllLanes of the first attribute EXPRESS_ROAD is TRUE.

If the parameter AllLanes of the first attribute EXPRESS_ROAD is not TRUE, then at step 38, the costs of the link remain unadjusted. The procedure may continue with the costs which represent the costs of the respective cost model. This reflects that the avoid option does not require roads to be avoided which have at least one lane that is not an express lane.

If it is determined that the parameter AllLanes of the first attribute EXPRESS_ROAD is not TRUE, then at step 37, the costs of the link are increased. Increasing the costs of the link at step 37 may be performed in various ways. For illustration, the costs of the respective cost model may be multiplied by a factor greater than 1. Alternatively, a value may be added to the costs of the respective cost model. Increasing the costs of the link at step 37 may be performed using mathematical operations or table look-ups. The route search may continue with the increased costs for the link.

While a route search taking into account avoid and prefer options for express lanes is illustrated in FIGS. 3 and 4, the route search may also include variants of such options in which use of express lanes is absolutely prohibited. In such a case, the respective links may be removed from consideration in the route search, based on the first attribute EXPRESS_ROAD and its parameter AllLanes.

FIG. 5 is a flow chart of a procedure 40 for controlling the outputting of route guidance information.

At step 41, road segments in a local environment of the vehicle are identified. The road segments may be identified based on a current vehicle position. The road segments may further be identified based on the result of a route search. The road segments identified at step 41 may include all road segments on which information is required for outputting guidance information.

At step 42, it is determined whether a lane of any one of the identified road segments has the second attribute EXPRESS_LANE assigned to it. This determination is made based on data retrieved from the map data base. For a map data base having a layered structure, the determination may be made based on second attributes stored in the guidance layer 14 (FIG. 2).

If it is determined that no lane of the road segment has a second attribute EXPRESS_LANE assigned to it, then at step 45, the guidance information is output. In this case, the guidance information is not modified based on the second attribute EXPRESS_LANE.

If it is determined that a lane of a road segment has a second attribute EXPRESS_LANE assigned to it, then at step 43, information on the number and types of lanes for the respective road segment is retrieved. The information may be retrieved from the map data base. If the map data base has a layered structure, such as map data base 10 (FIG. 1), the information may be retrieved from the guidance layer 14. The retrieved information may include information on the number of lanes of the road segment. The retrieved information may include information on which of the lanes are express lanes.

At step 44, output information is adjusted based on the information retrieved at step 43. Adjusting the output information may include adjusting speech output based on which lanes of a road segment are express lanes. Adjusting the output information may alternatively or additionally include adjusting optical output based on which lanes of a road segment are express lanes. The optical output information may be adjusted using, for example, color markings indicating an express lane or graphical icons indicating an express lane.

At step 45, the guidance information is then output. If a road segment which influences the guidance information output at the step 45 includes an express lane, the guidance information is generated based on information on the express lanes provided by the second attribute EXPRESS_LANE.

With reference to FIGS. 6-10, the definition of a first attribute and second attribute indicative of express lanes and the structure of the map data base will be explained in more detail.

Figure 6:
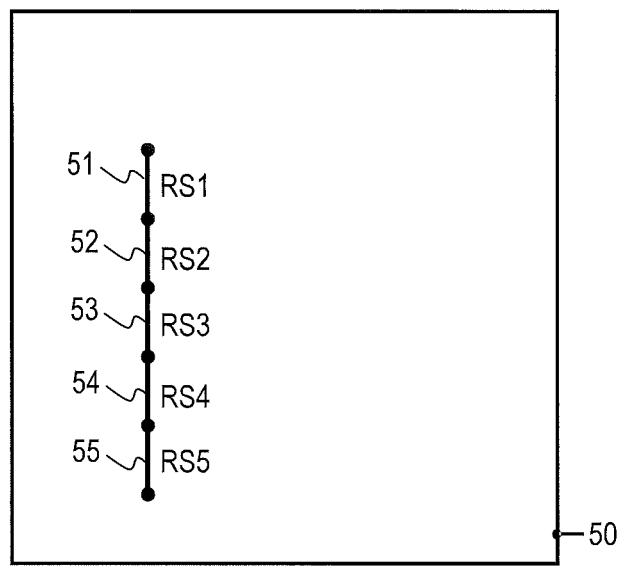
FIG. 6 illustrates a portion of a road network.

FIG. 6 is a schematic view of a road network including road segments 51-55. A tiling is defined which covers the road network. The tiling includes a tile 50.

The plurality of road segments 51-55 are referenced with labels "RS1", "RS5" in the map data base. Some of the road segments may include at least one express lane. For illustration, the road segments 51 and 52 labelled "RS1" and "RS2" in the map data base may consist entirely of express lanes. The road segment 53 labelled "RS3" in the map data base may have at least one express lane and at least one lane which is not an express lane. The road segments 54 and 55 may be assumed to not include any express lane.

The road segments 51-55 are represented by links in the map data base. Both the data in the routing layer and the data in the guidance layer may respectively be organized in accordance with the tiles in which the respective road segments are located. This allows local updates to be performed more easily.

Figure 7:
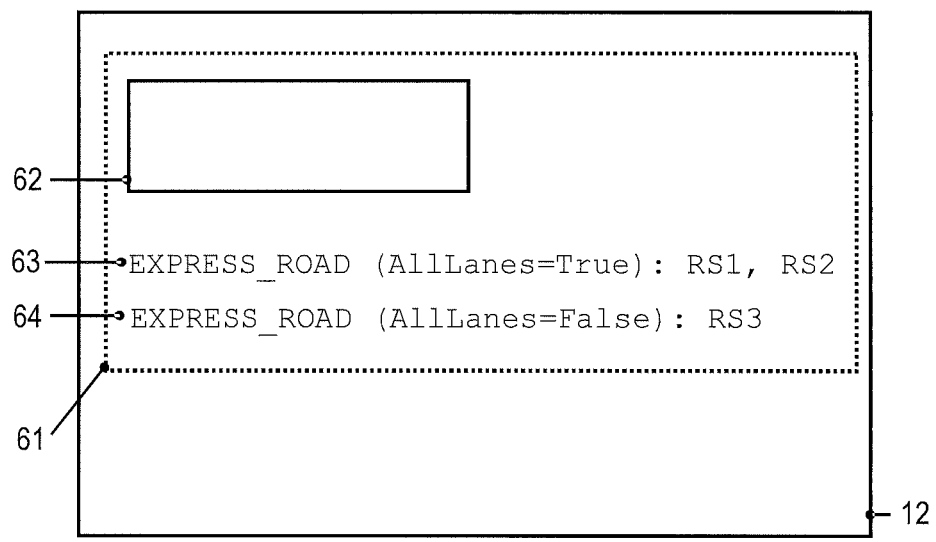
FIG. 7 is a schematic view for explaining a structure of a routing layer of a map data base.

FIG. 7 is a schematic representation of a section 12 of the routing layer. The section 12 represents a level which has a coarse resolution, with less important road segments being omitted. The set of road segments still present at the level may be selected based on, for example, functional road classes or other road segment characteristics.

The section 12 of the routing layer includes data 61 associated with the tile 50. The data 61 includes a data structure for each of the links representing the road segments 51-55. This data structure, schematically shown at 62 for the links representing road segments 51-55, includes a fixed number of data fields for each link. The data structure may have a pre-defined structure. A value must be set in each one of the fields.

The map data base further includes a first attribute assigned to links to indicate that the respective links include at least one express lane. The first attribute may also be stored in the data 61 for the tile 50 in which the respective road segments 51-55 are located.

The data 61 for the tile 50 includes a first attribute 63 with a Boolean parameter set to one value for the road segments labelled "RS1" and "RS2". This indicates that the road segments labelled "RS1" and "RS2" to which the first attribute 63 with the Boolean parameter set to one value is assigned consist entirely of express lanes.

The data 61 for the tile 50 includes a first attribute 64 with a Boolean parameter set to another value for the road segment labelled "RS3". This indicates that the road segment labelled "RS3" to which the first attribute 64 with the Boolean parameter set to another value is assigned has at least one express lane, but does not entirely consist of express lanes.

The first attributes 63 and 64 are not included in the predefined data structure 62 for the links. The first attributes 63, 64 are flexible attributes. The first attributes may be included in the data 61 of the routing layer representing a tile only if at least one road segment in the respective tile has at least one express lane.

In FIG. 7, the first attribute is indicated as attribute EXPRESS_ROAD, and the parameter of the first attribute is indicated as AllLanes.

Figure 8:
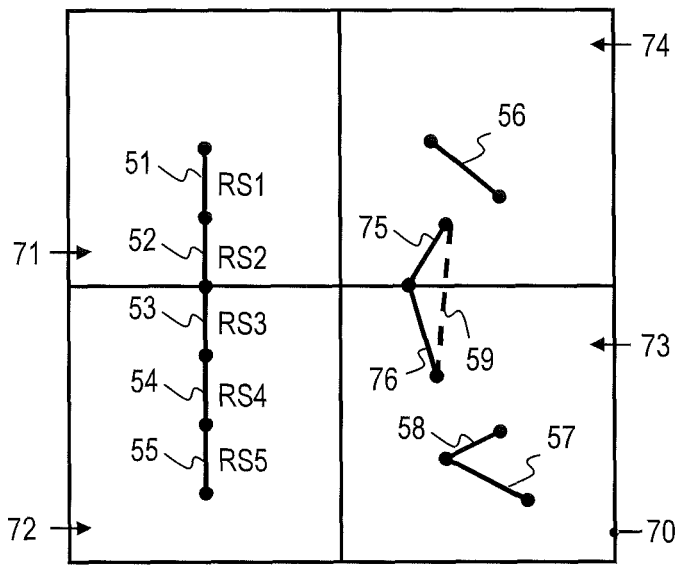
FIG. 8 illustrates the portion of the road network of FIG. 6 at another level.

FIG. 8 is a schematic view of the road network of FIG. 6. In FIG. 8, the road network is illustrated to a greater level of detail. While FIG. 8 and FIG. 6 represent the same road network at different levels, the road segments 56-59 of the road network which are present at the level illustrated in FIG. 8 are omitted at the coarser level illustrated in FIG. 6.

The road network includes the road segments 51-55 and the road segments 56-59. A tiling 70 is defined which covers the road network. The tiling includes tile 71-74. At the level of resolution illustrated in FIG. 8, the tile size of the tiles 71-74 is selected so as to be smaller than at the level of coarser resolution illustrated in FIG. 6.

The road network may include road segments located entirely within a tile and road segments which extend across tile boundaries. The road segment 59 extends across the boundary between the tiles 73 and 74. For organizing the data in the map data base, the road segment 59 may be associated with one link which reflects the topology of the road segment 59. Additionally, structures 75, 76 may be defined which reflect the geometry of the road segment 59, while respectively being located in one tile only. The structures 75, 76 may be referred to as geometry lines.

At the level of resolution indicated in FIG. 8 in which fewer road segments are omitted, or in which no road segments are omitted at all, data in the routing layer and in the guidance layer may also respectively be organized in a tile-by-tile fashion.

Figure 9:
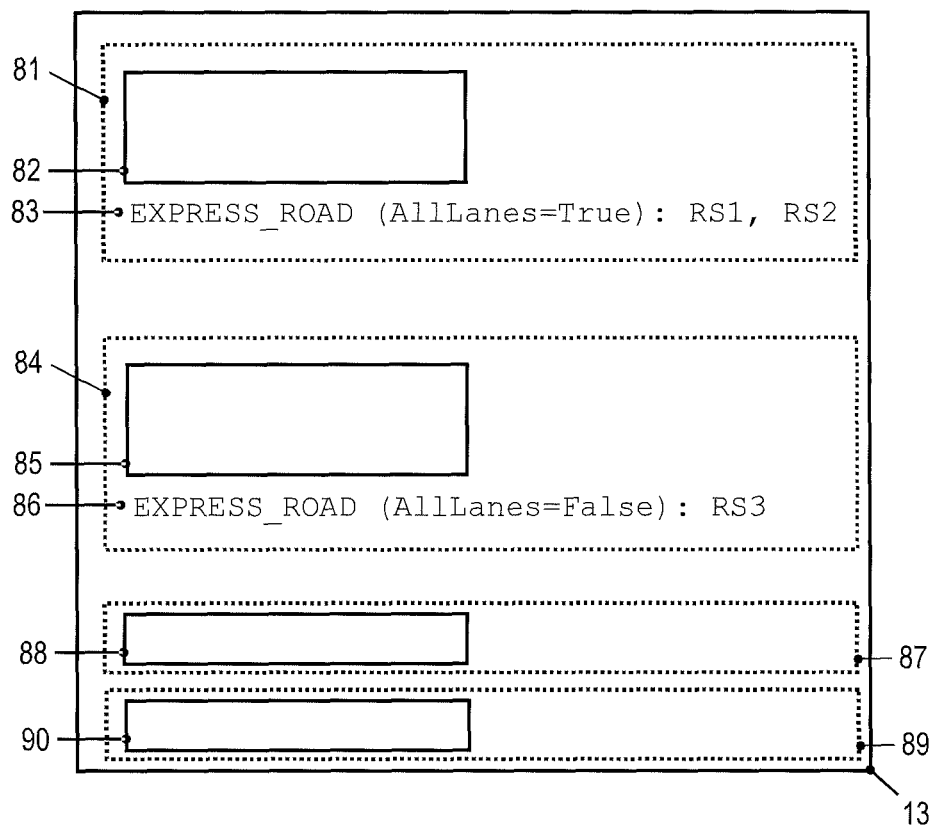
FIG. 9 is a schematic view for explaining a structure of a routing layer of a map data base at a level different from the one of FIG. 7.

FIG. 9 is a schematic representation of a section 13 of the routing layer. The section 13 represents a level representing the road network to a greater level of detail than the section 12 of FIG. 7. For illustration, the level of detail represented by the section 13 of the routing layer may include all road segments.

The section 13 of the routing layer includes data 81 associated with the tile 71. The data 81 includes a data structure for each one of the links representing the road segments 51 and 52 located within the tile 71. This data structure, schematically shown at 82 for the links representing road segments 51 and 52, includes a fixed number of data fields for each link and has a pre-defined structure. A value must be set in each one of the fields.

The map data base further includes a first attribute assigned to links to indicate that the respective links include at least one express lane. The first attribute may also be stored in the data 81 for the tile 71 in which the respective road segments 51 and 52 are located.

The data 81 for the tile 71 includes a first attribute 83 with a Boolean parameter set to one value (e.g., "TRUE") for the road segments labelled "RS1" and "RS2". As explained above, this indicates that the road segments labelled "RS1" and "RS2" to which the first attribute 83 with the Boolean parameter set to one value is assigned consist entirely of express lanes.

The section 13 of the routing layer includes data 84 associated with the tile 72. The data 84 includes a data structure for each one of the links representing the road segments 53-55 located within the tile 72. This data structure, schematically shown at 85 for the links representing road segments 53-55, includes a fixed number of data fields for each link and has a pre-defined structure. A value must be set in each one of the fields.

The map data base further includes a first attribute assigned to links to indicate that the respective links include at least one express lane. The first attribute may also be stored in the data 84 for the tile 72 in which the respective road segments 53-55 are located. The data 84 for the tile 72 includes a first attribute 86 with a Boolean parameter set to another value (e.g., "FALSE") for the road segment labelled "RS3". This indicates that the road segment labelled "RS3" to which the first attribute 86 with the Boolean parameter set to another value is assigned has at least one express lane, but does not entirely consist of express lanes.

Referring still to FIG. 9, the section 13 of the routing layer includes data 87 associated with the tile 73 and data 89 associated with the tile 74. The data 87 includes a data structure for each one of the links representing the road segments 57, 58 and for the geometry line 76 representing part of the road segment 59, which are located within the tile 73. This data structure schematically indicated at 88 consists of fixed attributes having a pre-defined number and types of fields. The data 89 includes a data structure for the link representing the road segment 56 and for the geometry line 75 representing part of the road segment 59, which are located within the tile 73. This data structure schematically indicated at 90 consists of fixed attributes having pre-defined data fields.

Assuming that none of the road segments in tiles 73 and 74 has an express lane, no first attribute is stored in the data 87 and 89 which represents the tiles 73 and 74. It is not required to store a first attribute in data associated with a tile in which no road segment has an express lane. Thereby, storage space requirements for implementing the excess lane attributes may be kept moderate.

In FIG. 9, the first attribute is indicated as an attribute EXPRESS_ROAD, and the parameter of the first attribute is indicated as AllLanes.

As can be taken from FIG. 7 and FIG. 9, according to an embodiment the first attributes for the road segments 51-53 may be stored both in the section 12 representing a higher level of road segments and in the section 13 representing the lower level and including more road segments.

Figure 10:
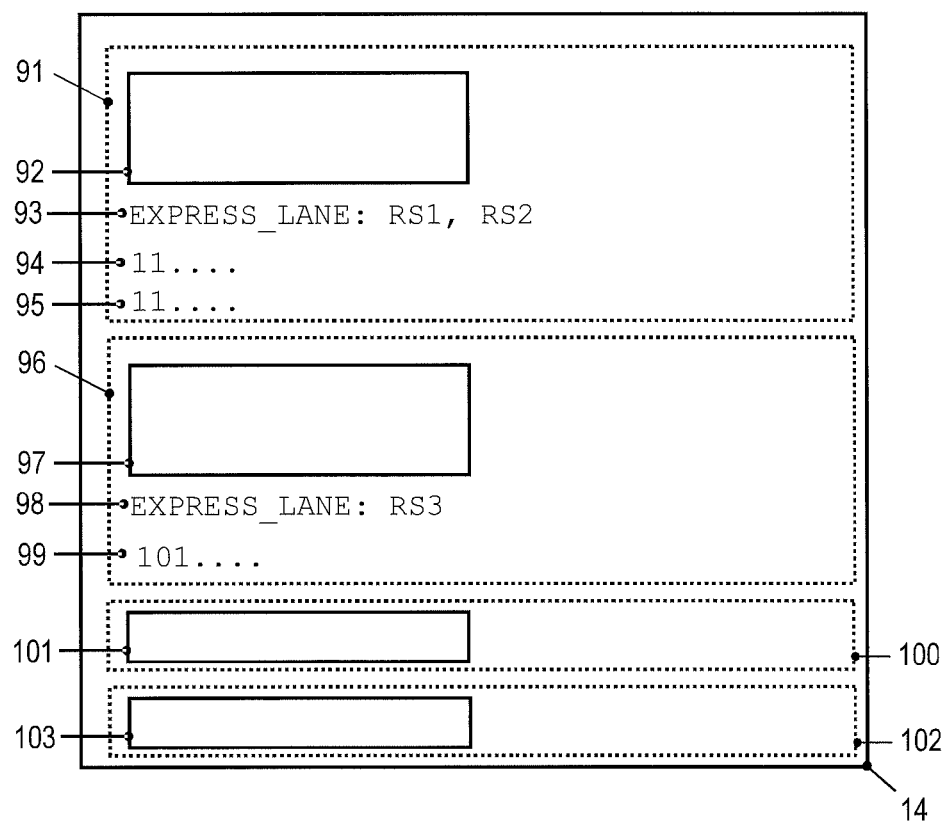
FIG. 10 is a schematic view for explaining a structure of a guidance layer of a map data base.

FIG. 10 is a schematic representation of a section of the guidance layer 14, again for the road network of FIG. 8. While the guidance layer 14 may also include plural levels representing the road network to different degrees of accuracy, the second attribute assigned to lanes in order to indicate express lanes does not need to be included in each one of the levels. If there are different levels, the second attribute may in particular be stored at the level in which the smallest number of road segments is omitted, that is, at the base level at which the road network is represented at the greatest level of detail. Only such a level is schematically illustrated in FIG. 10.

While the first attributes in the routing layer may be present in each one of different levels of the routing layer, it is sufficient to include the second attributes only in one of the levels of the guidance layer if the guidance layer has plural levels.

The guidance layer 14 includes data 91 associated with the tile 71. The data 91 includes a data structure for each one of the links representing the road segments 51 and 52 located within the tile 71. This data structure, schematically shown at 92 for the links representing road segments 51 and 52, includes a fixed number of data fields for each link and has a pre-defined structure. A value must be set in each one of the fields.

The map data base further includes a second attribute assigned to lanes of links to indicate that the respective lanes are express lanes. The second attribute may also be stored in the data 91 for the tile 71 in which the respective road segments 51 and 52 are located.

The data 91 for the tile 71 includes a second attribute 93 for the road segments labelled "RS1" and "RS2". Additional data structures 94 and 95 may be provided to assign the second attribute 93 to individual lanes of the road segments 51 and 52. The data structures 94 and 95 may represent a lane mask having one value, such as "1", if the respective lane of the road segment is an express lane, and another value, such as "0", if the respective lane of the road segment is not an express lane. The processor may group the second attribute 93 with the data structure 94 representing a lane mask of road segment 51 to identify the lanes of the road segment 51 which are express lanes. The processor may group the second attribute 93 with the data structure 95 representing a lane mask of road segment 52 to identify the lanes of road segment 52 which are express lanes.

The guidance layer includes data 96 associated with the tile 72. The data 96 includes a data structure for each one of the links representing the road segments 53-55 located within the tile 72. This data structure, schematically shown at 97 for the links representing road segments 53-55, includes a fixed number of data fields for each link and has a pre-defined structure. A value must be set in each one of the fields.

The data 96 for the tile 98 includes a second attribute 98 for the road segment labelled "RS3". An additional data structure 99 may be provided to assign the second attribute 98 to individual lanes of the road segment 53. The data structure 99 may represent a lane mask. The processor may group the second attribute 98 with the data structure 99 representing a lane mask of road segment 53 to identify the lanes of road segment 53 which are express lanes.

The guidance layer 14 includes data 100 associated with the tile 73 and data 102 associated with the tile 74. The data 100 includes at least fixed attributes 101 for the road segments in tile 73. The data 102 includes at least fixed attributes 103 for the road segments in tile 74. Assuming that none of the road segments in the tiles 73 and 74 has an express lane, no second attribute is stored in the data 100 and 102 which represent the tiles 73 and 74. It is not required to store a second attribute in data associated with a tile in which no road segment has an express lane. Thereby, storage space requirements for implementing the excess lane attributes may be kept moderate.

In FIG. 10, the second attribute is indicated as an attribute EXPRESS_LANE.

It will be appreciated that other map data base structures using first and second attributes may be utilized. For illustration, the second attribute EXPRESS_LANE may be directly assigned to individual lanes, rather than being assigned to individual lanes by an additional data structure as illustrated at 94, 95 and 99 in FIG. 10. Directly assigning the second attribute to individual lanes may be particularly useful if individual lanes are represented in the map data base as individual map features.

Figure 11:
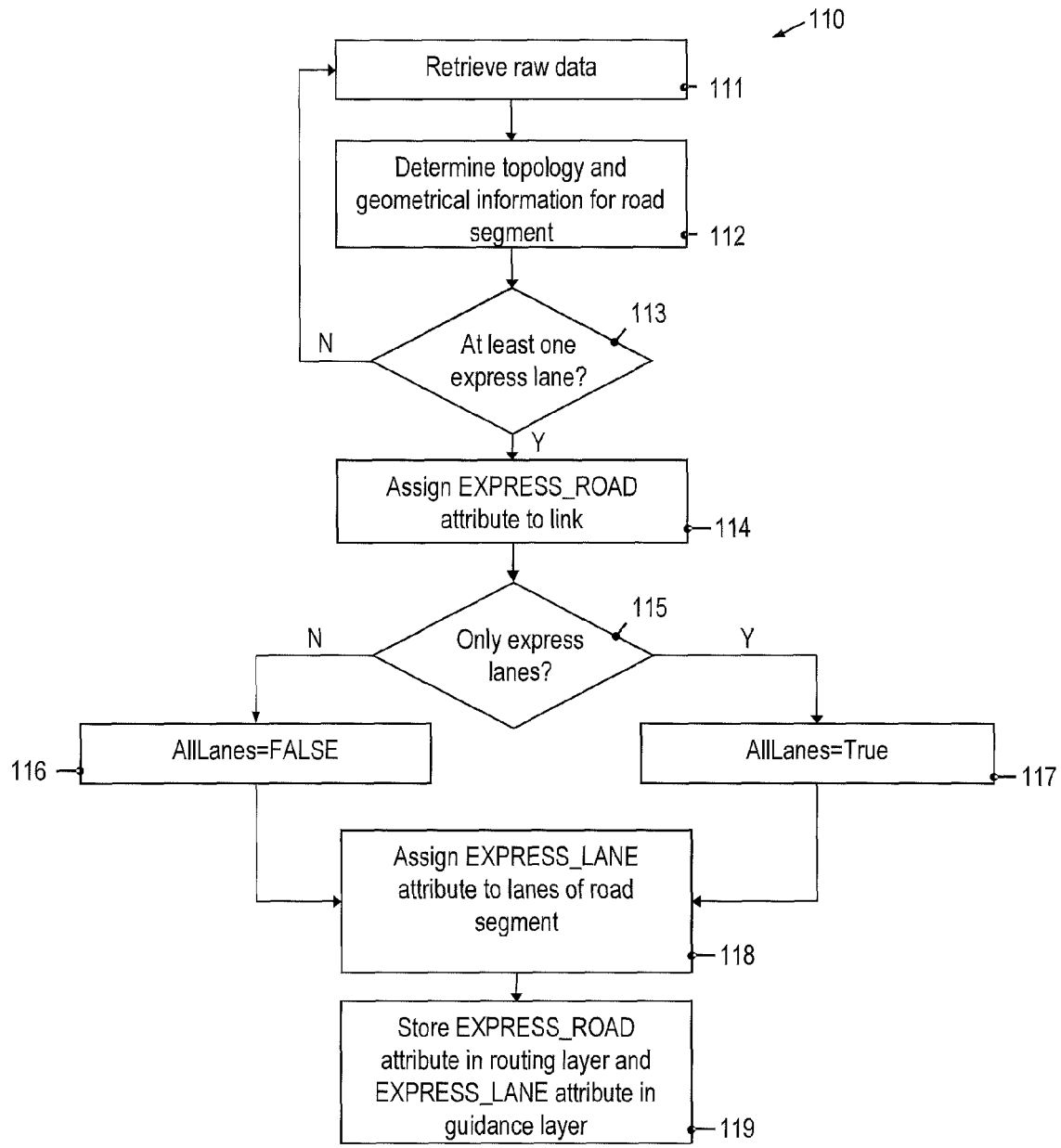
FIG. 11 is a flow chart illustration of a method of generating a map data base.

FIG. 11 is a flow chart of a method 110 of generating a map data base which includes attributes indicative of express lanes. The method may be performed by an electronic computing system. The method uses raw data which include information on road segments of a road network and on lanes of the road segments. Such data is provided by various vendors and may have various formats, such as for example, Navteq or Teleatlas. Using the method, the raw data are processed to form a data base which includes attributes indicative of express lanes.

At step 111, raw data are retrieved. The raw data may include information on a road segment and information on which lanes of the road segment are express lanes. Such raw data may have a format which is unsuitable for direct use in a vehicle navigation device, for example due to storage space limitations or due to inefficient access.

At step 112, a topology and geometry information of the road segment is determined. The topology may include information on a starting point and end point of the road segment, on connections to other map features or similar. The geometry information may include information on the geometry of a road segment or of a portion of the road segment located in one tile of a tiling. The topology information may be used to generate a link in the map data which represents the road segment.

At step 113, it is determined whether the road segment has at least one express lane. If it is determined that the road segment has no express lane, no attributes indicative of express lanes need to be stored for the road segment. The method may return to step 111.

If it is determined that the road segment has at least one express lane, at step 114, a first attribute EXPRESS_ROAD is assigned to the link. The first attribute may be registered for subsequent storage in the map data. The first attribute may, but does not need to be stored immediately. Rather, first attributes assigned to different road segments located in a tile may be aggregated for subsequent storage.

At step 115, it is determined whether all lanes of the road segment are express lanes. If it is determined that the road segment has at least one lane which is not an express lane, then at step 116, a Boolean parameter AllLanes of the first attribute EXPRESS_ROAD is set to FALSE. If it is determined that all lanes of the road segment are express lanes, then at step 117, a Boolean parameter AllLanes of the first attribute EXPRESS_ROAD is set to TRUE. The parameter may be registered for subsequent storage in the map data. The parameter may, but does not need to be stored immediately. Rather, first attributes together with the respectively set parameters assigned to different road segments located in a tile may be aggregated for subsequent storage.

At step 118, a second attribute EXPRESS_LANE is assigned to lanes of the road segment. The second attribute is selectively assigned based on which ones of the lanes are express lanes. In some embodiments, the attribute EXPRESS_LANE may be assigned only to lanes which are express lanes. Assigning the second attribute EXPRESS_LANE to lanes of road segments may involve generating a data structure associating the second attribute with individual lanes, as shown at 94, 95 and 99 in FIG. 10. This data structure may have a lane mask format in which digits of a binary string represent individual lanes of a road segment. Alternatively, the second attribute EXPRESS_LANE may be stored such that it is directly associated with individual lanes of a road segment, without requiring a lane mask.

At step 119, the first attribute EXPRESS_ROAD may be stored in a routing layer of a map data base. The second attribute EXPRESS_LANE may be stored in a guidance layer of a map data base.

It is not required to store the first and second attributes in the map data base individually for each road segment. Rather, a tiling may be defined and the steps 111-118 may first be repeated for all road segments included in a tile. The information on the links to which the first attribute is to be assigned and on the lanes to which the second attribute is to be assigned can be aggregated and stored subsequently after the steps 111-118 have been performed for all road segments of a tile. This process may be repeated iteratively for different tiles.

In the method, if a tile does not have any road segment which has at least one express lane, it is not required to store a first attribute or a second attribute in the data representing the tile in the map data base.

Additionally, in some embodiments, it may not be required to store the second attribute for lanes of a road segment if all lanes of the road segment are express lanes. That is, the method may proceed from the step 117 directly to the step 119. Thus, in some embodiments, the map data base may include the second attribute only for lanes of road segments which have at least one express lane, but do not entirely consist of express lanes.

The map data base generated using the method of FIG. 11 may have various formats. For illustration rather than limitation, the map data base may be a map data base set up in accordance with the NDS. The first attribute and the second attribute may be flexible attributes as defined in the NDS.

The map data base generated using the method of FIG. 11 may be used in a vehicle navigation device according to an embodiment.

While devices and methods according to embodiments have been described in detail, modifications may be implemented in other embodiments. For illustration, it is not required that the map data base used by devices and methods of embodiments stores data organized in accordance with a tiling. If a tiling is used for organizing the map data base, the tiling need not be a square tiling but may be any other tiling covering a road network. Different tilings may be used for routing and guidance functions. The tiling defined for the routing layer may comprise tiles, and these tiles may be different in size and/or shape from other tiles of another tiling defined for the guidance layer.

For further illustration, while the first attribute may have a Boolean parameter, the first attribute may have a parameter of another parameter type. For illustration, the first attribute may have a parameter of integer parameter type. The parameter may be indicative of a number of lanes of the respective road segment.

For further illustration, while the map data base of embodiments may include the second attribute for any road segment which includes at least one express lane, in other embodiments the map data base may not have a second attribute for lanes of a road segment which consists entirely of express lanes. In this case, information on the lanes which are express lanes may be derived from the first attribute and its parameter.

Embodiments of the invention may be used for vehicle navigation devices.

Although the present invention has been illustrated and described with respect to several preferred embodiments thereof, various changes, omissions and additions to the form and detail thereof, may be made therein, without departing from the spirit and scope of the invention.

What is claimed is:

1. A vehicle navigation device, comprising:
a map data base storing map data comprising links and attributes, said links representing road segments, wherein a first attribute is respectively assigned to a subset of said links to indicate that said links included in said subset include at least one express lane, and wherein a second attribute is respectively assigned to lanes of at least a fraction of said links included in said subset to indicate which lanes of the respective road segment are express lanes, said second attribute being different from said first attribute, and
a processing unit coupled to said map data base and configured to perform a route search based at least on said first attribute and independently of said second attribute when a prefer or avoid option for express lanes is set, and to control outputting of route guidance information via a user interface based at least on said second attribute.

2. The vehicle navigation device of claim 1,
wherein said map data base includes a data structure for each link, the data structure having a fixed number of data fields for a link with a value being respectively set for each one of the data fields,
wherein said first attribute and said second attribute are stored separately from said data structures.

3. The vehicle navigation device of claim 1,
said first attribute having a Boolean parameter,
said processing unit being configured to perform a route search for links based on both said first attribute and said Boolean parameter.

4. The vehicle navigation device of claim 3,
wherein, in said map data base, said first attribute with said Boolean parameter set to a first value is respectively assigned to links which consist entirely of express lanes, and said first attribute with said Boolean parameter set to a second value different from said first value is respectively assigned to links which include at least one express lane and at least one non-express lane.

5. The vehicle navigation device of claim 1,
said map data base including a first portion and a second portion, said first attribute being stored in said first portion and said second attribute being stored in said second portion,
said processing unit being configured to control the outputting of route guidance information based on data retrieved from said second portion and independently of data stored in said first portion.

6. The vehicle navigation device of claim 5,
said first portion being a first table and said second portion being a second table different from said first table.

7. The vehicle navigation device of claim 1,
wherein each road segment is located in at least one tile of a tiling, and
wherein said map data base includes said first attribute for links located in a tile of said tiling only if at least one of the road segments represented by said links has at least one express lane.

8. The vehicle navigation device of claim 7,
wherein each road segment is located in at least one tile of a further tiling, and
wherein said map data base includes said second attribute for lanes of road segments located in a tile of said further tiling only if at least one of said road segments located in said tile of said further tiling has at least one express lane.

9. A method performed in a processor of generating a map data base, comprising
retrieving data including information on road segments and on lanes of each road segment;
for the data associated with a plurality of road segments
determining whether said road segment has at least one express lane,
selectively assigning a first attribute to a link representing said road segment if at least one lane of said road segment is an express lane, and
selectively assigning a second attribute to lanes of said road segment, said second attribute being selectively assigned based on which lanes of said road segment are express lanes; and
storing said first attributes in a first portion of said map data base which represents data for route search and storing said second attributes in a second portion of said map data base which represents data for outputting route guidance information.

10. The method of claim 9,
wherein said selectively assigning said first attribute comprises setting a parameter of said first attribute based on whether all lanes of said road segment are express lanes, and wherein said parameter is stored in said map data base.

11. The method of claim 9,
wherein a tiling comprising a plurality of tiles and covering said road segments is defined, wherein, for each tile of said tiling, a first attribute is stored in said map data base only if at least one road segment contained in the respective tile of said tiling includes at least one express lane.

12. The method of claim 11,
wherein a further tiling comprising a plurality of tiles and covering said road segments is defined,
wherein, for each tile of said further tiling, a second attribute is stored in said map data base only if at least one road segment contained in the respective tile of said further tiling includes at least one express lane.

13. A method performed in a processor of processing data stored in a map data base, said map data base storing links representing road segments, first attributes and second attributes, said first attributes being assigned to a subset of links to indicate that said links included in said subject include at least one express lane and said second attributes being assigned to lanes of at least a fraction of said subset of links, said method comprising
performing a route search, including
monitoring activation of a prefer or avoid option for express lanes, and
selectively adjusting costs of routes based on said first attributes assigned to links
if said prefer or avoid option is activated;
wherein said route search is performed independently of said second attributes; and
outputting route guidance information based on said second attributes.

14. The method of claim 13,
wherein said outputting of said route guidance information is performed independently of said first attributes.

15. A vehicle navigation device, comprising:
a map data base storing map data comprising links and attributes, said links representing road segments, wherein a first attribute is respectively assigned to a subset of said links to indicate that said links included in said subset include at least one express lane, and wherein a second attribute is respectively assigned to lanes of at least a fraction of said links included in said subset to indicate which lanes of the respective road segment are express lanes, said second attribute being different from said first attribute, and a processing unit that receives data from said map data base and is configured to perform a route search based at least on said first attribute and independently of said second attribute when at least one of a prefer or avoid option for express lanes is set, and to control outputting of route guidance information via a user interface based at least on said second attribute.

16. The vehicle navigation device of claim 15, wherein said map data base includes a data structure for each link, the data structure having a fixed number of data fields for a link with a value being respectively set for each one of the data fields, wherein said first attribute and said second attribute are stored separately from said data structures.

17. The vehicle navigation device of claim 15, said first attribute having a Boolean parameter, said processing unit being configured to perform a route search for links based on both said first attribute and said Boolean parameter.

18. The vehicle navigation device of claim 17, wherein, in said map data base, said first attribute with said Boolean parameter set to a first value is respectively assigned to links which consist entirely of express lanes, and said first attribute with said Boolean parameter set to a second value different from said first value is respectively assigned to links which include at least one express lane and at least one non-express lane.

19. The vehicle navigation device of claim 15, said map data base including a first portion and a second portion, said first attribute being stored in said first portion and said second attribute being stored in said second portion, said processing unit being configured to control the outputting of route guidance information based on data retrieved from said second portion and independently of data stored in said first portion.

20. The vehicle navigation device of claim 15, wherein each road segment is located in at least one tile of a tiling, and wherein said map data base includes said first attribute for links located in a tile of said tiling only if at least one of the road segments represented by said links has at least one express lane.

* * * * *